US012639201B2

(12) United States Patent
Thomas et al.

(10) Patent No.: US 12,639,201 B2
(45) Date of Patent: May 26, 2026

(54) METHOD FOR SUPPORTING INCREASED LOGICAL CAPACITY USING THIN PROVISIONING WITHOUT INCREASING DRAM SIZE

(71) Applicant: SanDisk Technologies LLC, Austin, TX (US)

(72) Inventors: Nicholas Thomas, Edinburgh (GB);
Dylan Dewitt, Rochester, MN (US);
Stephen Gold, Fort Collin, CO (US);
Daniel Tuers, Kapaa, HI (US)

(73) Assignee: Sandisk Technologies, Inc., Milpitas, CA (US)

( * ) Notice: Subject to any disclaimer, the term of this patent is extended or adjusted under 35 U.S.C. 154(b) by 4 days.

(21) Appl. No.: 18/603,150

(22) Filed: Mar. 12, 2024

(65) Prior Publication Data

US 2025/0291709 A1 Sep. 18, 2025

(51) Int. Cl.
*G06F 12/02* (2006.01)
*G06F 12/1009* (2016.01)

(52) U.S. Cl.
CPC ...... *G06F 12/0223* (2013.01); *G06F 12/0246* (2013.01); *G06F 12/1009* (2013.01); *G06F 2212/7201* (2013.01)

(58) Field of Classification Search
CPC .......................... G06F 12/0223; G06F 12/1009
See application file for complete search history.

(56) References Cited

U.S. PATENT DOCUMENTS

| | | | |
|---|---|---|---|
| 6,389,507 B1 * | 5/2002 | Sherman | H04L 45/7453 |
| | | | 711/108 |
| 8,826,041 B1 * | 9/2014 | Contreras | H04L 9/3247 |
| | | | 713/193 |
| 8,868,954 B1 * | 10/2014 | Balakrsihnan | G06F 3/0611 |
| | | | 713/324 |
| 9,104,599 B2 | 8/2015 | Atkisson | |

(Continued)

OTHER PUBLICATIONS

Q. Wu, Y. Zhou, F. Wu, H. Jiang, J. Zhou and C. Xie, "Understanding and Exploiting the Full Potential of SSD Address Remapping," in IEEE Transactions on Computer-Aided Design of Integrated Circuits and Systems, vol. 41, No. 11, pp. 5112-5125, Nov. 2022, doi: 10.1109/TCAD.2022.3144617. (Year: 2022).*

*Primary Examiner* — Reginald G Bragdon
*Assistant Examiner* — Zakaria Mohammed Belkhayat
(74) *Attorney, Agent, or Firm* — Arlene Neal; NEAL BLIBO LLC

(57) ABSTRACT

A storage device provides thin provisioning by presenting more logical capacity than available physical capacity. The storage device uses a dynamic random-access memory (DRAM) having a size that is proportional to the available physical capacity of the storage device. The storage device includes a memory device with a physical capacity and the DRAM. A controller on the storage device creates segments including logical block address (LBA) sets in an LBA space. The LBA sets include an LBA from each segment that are linked to enable the LBAs in a LBA set to share a mapping space in the DRAM. The controller also creates an L2P table including a LBA set entry per LBA set, with each LBA set (Continued)

START

510 CONTROLLER 108 MAY CREATE SEGMENTS INCLUDING LBA SETS

520 CONTROLLER 108 MAY FORM AN L2P TABLE INCLUDING A LBA SET ENTRY PER LBA SET WITH EACH LBA SET ENTRY INCLUDING SUB-ENTRIES FOR STORING THE PHYSICAL LOCATIONS ON THE MEMORY DEVICE THAT ARE ASSOCIATED WITH THE LBAS IN THE LBA SET

530 CONTROLLER MAY STORE THE L2P TABLE IN DRAM 106

540 CONTROLLER 108 MAY STORE A LBA AND PHYSICAL LOCATION PAIR IN AN OVERFLOW BUFFER WHEN THE SUB-ENTRIES BECOME FULL

END entry including sub-entries to store physical locations on the memory device that are associated with the LBAs in the LBA set. The controller also stores the L2P table in the DRAM.

19 Claims, 7 Drawing Sheets

(56)                    References Cited

U.S. PATENT DOCUMENTS

|  |  |  |  |  |
|---|---|---|---|---|
| 9,665,302 | B1 * | 5/2017 | Huff | G06F 3/0608 |
| 11,288,180 | B2 | 3/2022 | Frolikov | |
| 11,301,149 | B2 | 4/2022 | Harris | |
| 11,650,917 | B2 | 5/2023 | Brandt | |
| 11,663,136 | B2 | 5/2023 | Xie | |
| 2006/0087940 | A1 * | 4/2006 | Brewer | G06F 11/2061 |
| | | | | 369/47.12 |
| 2015/0169465 | A1 * | 6/2015 | Slepon | G06F 12/0246 |
| | | | | 711/103 |
| 2017/0075620 | A1 * | 3/2017 | Yamamoto | G06F 3/0688 |
| 2017/0235510 | A1 * | 8/2017 | Hu | G06F 13/32 |
| | | | | 710/308 |
| 2018/0067660 | A1 * | 3/2018 | Yamamoto | G06F 3/0641 |
| 2019/0171565 | A1 * | 6/2019 | Bowen-Huggett | G06F 12/06 |

* cited by examiner

100

| LBA SPACE 202 | |
|---|---|
| SEGMENT 204A | LBA 0 |
| | LBA 1 |
| | ... |
| | LBA N-1 |
| SEGMENT 204B | LBA 0 |
| | LBA 1 |
| | ... |
| | LBA N-1 |
| SEGMENT 204C | LBA 0 |
| | LBA 1 |
| | ... |
| | LBA N-1 |
| SEGMENT 204N | LBA 0 |
| | LBA 1 |
| | ... |
| | LBA N-1 |

FIG. 2

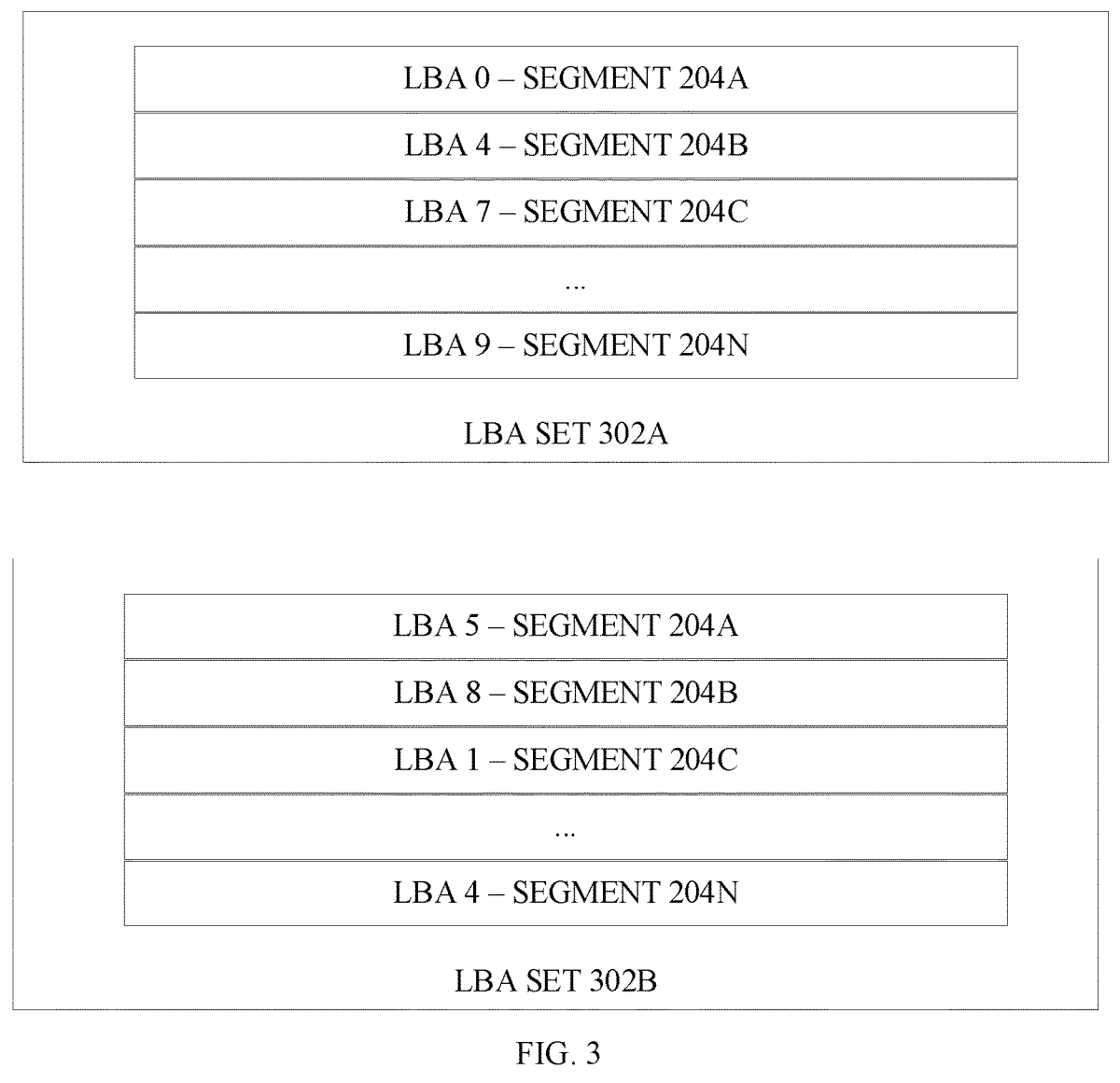

| LBA 0 – SEGMENT 204A |
| LBA 4 – SEGMENT 204B |
| LBA 7 – SEGMENT 204C |
| ... |
| LBA 9 – SEGMENT 204N |

LBA SET 302A

| LBA 5 – SEGMENT 204A |
| LBA 8 – SEGMENT 204B |
| LBA 1 – SEGMENT 204C |
| ... |
| LBA 4 – SEGMENT 204N |

LBA SET 302B

FIG. 3

| SUB-ENTRY 406A | SUB-ENTRY 406B | SUB-ENTRY 406C |
|---|---|---|
| SUB-ENTRY 406D | SUB-ENTRY 406E | SUB-ENTRY 406F |
| ... | | |
| | | SUB-ENTRY 406M |

LBA SET ENTRY 404A

| SUB-ENTRY 406A | SUB-ENTRY 406B | SUB-ENTRY 406C |
|---|---|---|
| SUB-ENTRY 406D | SUB-ENTRY 406E | SUB-ENTRY 406F |
| ... | | |
| | | SUB-ENTRY 406M |

LBA SET ENTRY 404B

...

| SUB-ENTRY 406A | SUB-ENTRY 406B | SUB-ENTRY 406C |
|---|---|---|
| SUB-ENTRY 406D | SUB-ENTRY 406E | SUB-ENTRY 406F |
| ... | | |
| | | SUB-ENTRY 406M |

LBA SET ENTRY 404L

L2P TABLE 402

METHOD FOR SUPPORTING INCREASED LOGICAL CAPACITY USING THIN PROVISIONING WITHOUT INCREASING DRAM SIZE

BACKGROUND OF THE INVENTION

A storage device may be communicatively coupled to a host and to non-volatile memory including, for example, a NAND flash memory device on which the storage device may store data received from the host. The storage device may store data in blocks on the memory device and the host may address the data using logical block addresses that may be mapped to physical addresses on the memory device. The logical block address to physical address mappings may be stored in a logical-to-physical (L2P) table cached in a dynamic random-access memory (DRAM) on the storage device. The storage device may access the L2P table to retrieve data from the memory device. In an example, if the storage device has one terabyte (TB) of physical capacity, the L2P table may map one TB of logical capacity to the one TB of physical capacity on the storage device in a thick provisioning approach. The storage device may use about one gigabyte on the DRAM to store a L2P table associated with a one TB storage device using thick provisioning.

In an enterprise storage device, the storage device may be shared with, for example, multiple virtual machines, wherein each virtual machine may be assigned a portion of the overall capacity of the storage device. Typically, each virtual machine may not use all the storage capacity assigned to it. The unused physical capacity by the virtual machine may cause some physical capacity of the storage device to remain unused and wasted. Providers of enterprise storage devices may therefore want to implement thin provisioning to provide multiple namespaces such that the sum of the logical capacity presented to customers may be greater than the physical capacity of the storage device. For example, the enterprise storage device may present two TB of logical capacity that may be mapped to one TB of physical capacity. In the mapping table associated with thin provisioning, some of the logical block addresses may be mapped to the physical addresses on the memory device and some of the logical block addresses may be unmapped. The mapping table for thin provisioning may thus be larger than that of thick provisioning for a given physical capacity. The larger L2P table associated with thin provisioning may not fit in the DRAM provided in a standard off-the shelf storage device. Customizing the DRAM for thin provisioning may lead to additional cost for providers of enterprise storage devices. The larger L2P table may also impact the read and write performance on the storage device. A storage device is thus needed to present more logical capacity than physical capacity on a DRAM having a size that is proportional to the physical capacity of the storage device.

SUMMARY OF THE INVENTION

In some implementations, the storage device may provide thin provisioning by presenting more logical capacity than available physical capacity and using a dynamic random-access memory (DRAM) having a size that is proportional to the physical capacity of the storage device. The storage device includes a memory device including a physical capacity to store data. The storage device also includes a DRAM having a size that is proportional to the physical capacity of the memory device. A controller on the storage device creates segments including logical block address (LBA) sets in a LBA space. The LBA sets include LBAs that are linked to enable the LBAs in a LBA set to share a mapping space in the DRAM. The controller also creates an L2P table including a LBA set entry per LBA set, with each LBA set entry including sub-entries to store physical locations on the memory device that are associated with the LBAs in the LBA set. The controller also stores the L2P table in the DRAM. The L2P table presents more logical capacity than the physical capacity of the storage device.

In some implementations, a method is provided for providing thin provisioning on a storage device. The method also includes forming an L2P table including a LBA set entry per LBA set, with each LBA set entry including sub-entries for storing physical locations on the memory device that are associated with the LBAs in the LBA set. The method further includes storing the L2P table in the DRAM. The L2P table presents more logical capacity than the physical capacity of the storage device In some implementations, the storage device provides thin provisioning by presenting more logical capacity than available physical capacity and using a dynamic random-access memory (DRAM) having a size that is proportional to the physical capacity of the storage device. The storage device includes a memory device including a physical capacity to store data. The storage device also includes a DRAM having a size that is proportional to the physical capacity of the memory device. A controller on the storage device creates segments including LBA sets. The controller also forms an L2P table including a LBA set entry per LBA set, with each LBA set entry including sub-entries for storing physical locations on the memory device that are associated with the LBAs in the LBA set. The controller stores the L2P table in the DRAM, and stores a LBA and physical location pair in the overflow buffer when the sub-entries become full. The controller may also store an overflow buffer for the L2P in the DRAM.

BRIEF DESCRIPTION OF THE SEVERAL VIEWS OF THE DRAWINGS

FIG. 2 is a block diagram of an logical block address (LBA) space in accordance with some implementations.

FIG. 3 is a block diagram of an LBA set in accordance with some implementation.

FIG. 4 is a block diagram of a logical-to-physical table in a dynamic random-access memory in accordance with some embodiments.

Figure 1:
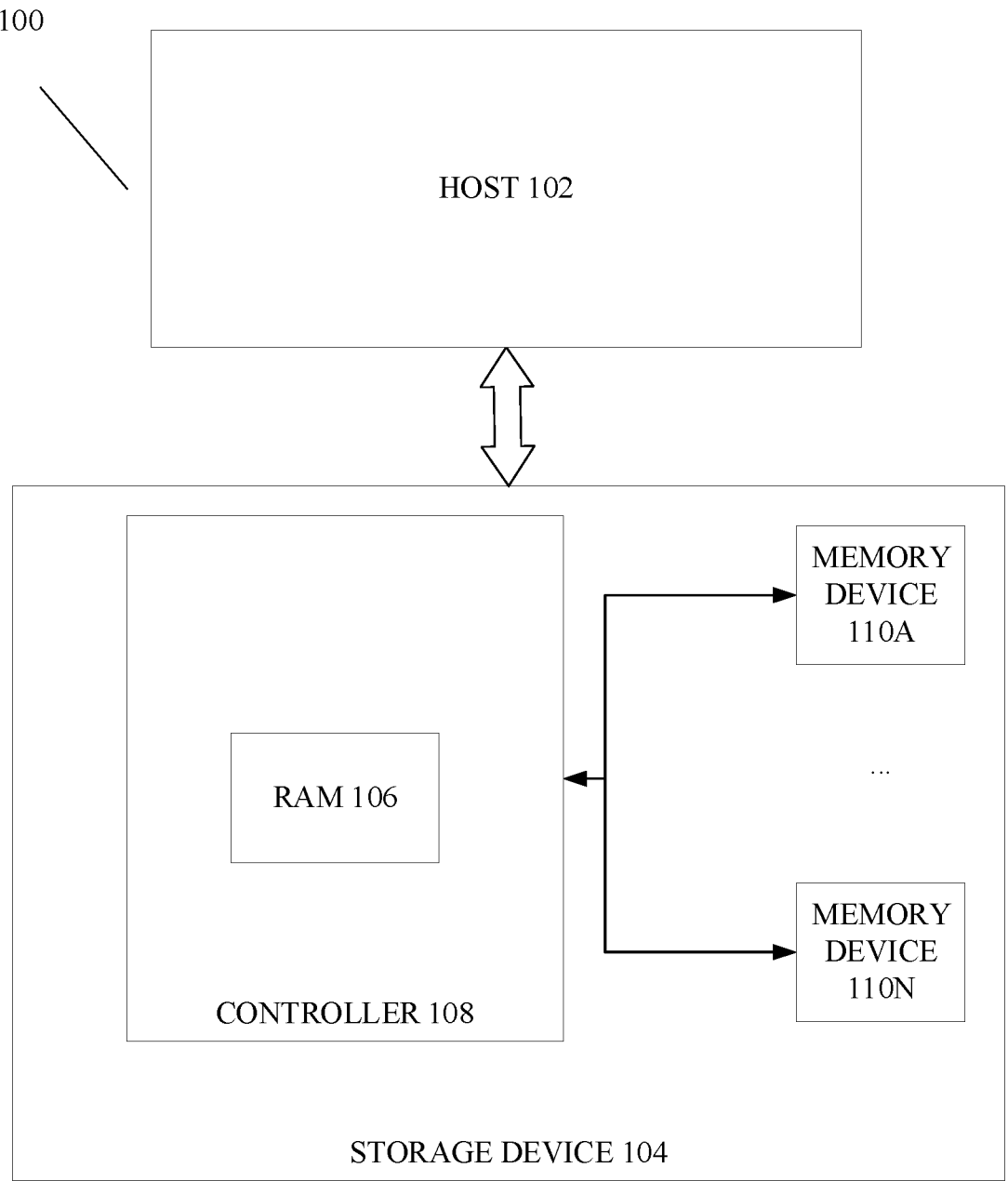
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110d (referred to herein as memory device(s) 110). Storage device 104 may be, for example, a solid-state drive (SSD), and the like. RAM 106 may be temporary storage such as a dynamic RAM (DRAM) that may be used to cache information such as a logical-to-physical (L2P) table in storage device 104. The size of DRAM 106 may be proportional to the physical capacity of memory device 110.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. To allow thin provisioning on storage device 104 while maintaining a DRAM size that is proportional to the physical capacity of storage device 104, controller 108 may divide the logical block address (LBA) space associated with the physical address space on memory device 110 into equal fixed sized segments. Controller 108 may pair an LBA in a first segment with an LBA from each segment in the LBA space to create a LBA set, wherein a LBA set may include a LBA from each segment within the LBA space. The mappings of the LBAs to the LBA sets may be done in a random manner, an algorithmic manner, or some combination (though ideally it may be a simple operation to determine to which LBA set any given LBA within any segment belongs). This may create a link between LBAs in a LBA set to enable the LBAs in the LBA set to share a mapping space in DRAM 106.

Each segment may optionally be mapped to/contained within a single namespace that may correspond to a client virtual machine. Controller 108 may create the L2P table to map the LBAs to the physical capacity of memory device 110, wherein controller 108 may store the L2P table in DRAM 106. The L2P table may include a single LBA set entry per LBA set, rather than per LBA. The LBAs and/or the physical locations associated with the LBAs may be stored within the sub-entries of an LBA set entry. The number of LBA set entries in DRAM 106 may be equivalent to the logical capacity of storage device 104 (i.e., the total number of LBAs) divided by the number of segments. To find an LBA within an LBA set entry in DRAM 106 without affecting the performance of storage device 104, controller 108 may use a bit map, wherein the bit map may indicate if a LBA from a segment is represented within an LBA set entry in DRAM 106. Each LBA set entry may include a segment identifier (ID) bitmap, the size of which in bytes (B) may be equal to the number of segments divided by eight.

Controller 108 may store the physical location associated with an LBA within a sub-entry in the LBA set entry to which the LBA belongs. The sub-entries in a LBA set entry may include insufficient space to concurrently store all physical locations for all LBAs within the LBA set. This is so that the sum of the sizes of all sub-entries is less than the sum of the sizes of all possible physical locations, such that the mapping table may be fit into a smaller DRAM space than would be possible using a conventional entry per LBA approach. To identify which sub-entry corresponds to a given LBA, controller 108 may assign segment IDs to the LBAs to be represented in the bitmap. The sub-entries may be sorted by the segment IDs using, for example, a hardware bitmap counter to count occupied segment IDs in the bitmap to find a sub-entry offset. Controller 108 may insert and/or delete a sub-entry by shifting sub-entries to maintain an order.

The size of a LBA set entry may be equal to the number of segments ($N^S$) divided by eight added to $S^E$ times the physical capacity ($C^E$) of the entry, i.e., $N^S/8+S^EC^E$ bytes (B) where usually $S^E$ may be equal to 4 ($S^E$ is a space to store a physical address). Controller 108 may manage DRAM 106 such that with some dedicated and simple hardware, acceleration, translation, and update of LBAs contained within sub-entries may be fast and comparable to a conventional system where there is a one-to-one LBA to physical location map.

It may be assumed that an average number of LBAs in a LBA set may be occupied, where the average number of occupied LBAs may be dependent on a ratio of logical to physical space provisioned. To avoid systematic bias in occupancy of specific LBA sets, controller 108 may randomize the storage of LBAs within segments. For example, suppose each segment is precisely mapped to a namespace. LBA 0 of each namespace may be most likely written. To avoid hitting the physical capacity limit ($C^E$), LBA 0s of each namespace may not linked to the same LBA set. There may be advantages in maintaining mappings to sequential LBAs in DRAM 106, but the physical addresses of sequential LBAs may not be sequential in DRAM 106.

There may be a finite probability that when an LBA is written, the sub-entries in the LBA set to which the LBA is a member may not have any space to store the newly written physical location. The probability of such an event may be carefully managed by appropriate selection of the sub-entry capacity and the size of the supported LBA space (as a result, the degree of thin provisioning). At the same time the overall mapping table may be designed to fit within available RAM sizes (typically DRAM chips). As such, the RAM sizes may also impact parameter selections. In an implementation, only a certain physical capacity may be occupied for the number of LBAs in the LBA set entry. The probability that any LBA set entry with capacity $C^E$ is not filled may be calculated to be close to one. At the drive level, the probability that no entries are filled may be close to one and may be calculated to be a lower number than the probability that any LBA set entry with capacity $C^E$ is not filled and may also be close to one. As soon as an LBA set entry becomes full, controller 108 may use an overflow buffer. The overflow buffer may store physical locations for LBAs that have overflowed from their sub-entries in an LBA set entry. The overflow buffer can store physical locations from any LBA set. The overflow entry format may include LBA and physical location/address (JBAs) pairs.

The overflow buffer may be sized the same as a LBA set entry for convenience, but internally rather than being a set of 4B JBAs sub-entries, the overflow buffer may be a set of 8B LBA-JBA pairs. On LBA update, whenever an LBA set entry reports being full (i.e., all sub-entries within the LBA set entry are occupied), if controller 108 determines that the segment ID associated with the LBA is less than a segment ID of the last sub-entry within the LBA set entry (i.e., the last sub-entry found by counting bitmap entries), then controller 108 may shift the last sub-entry to the overflow buffer, wherein the LBA may be reconstructed from the segment ID and the LBA set entry ID. On LBA update, whenever an LBA set entry reports being full, if controller 108 determines that the segment ID is greater than segment ID of the last sub-entry, controller 108 may add the new LBA to the overflow buffer. Reverse logic may occur when LBAs are being trimmed, such that entries are removed from the overflow buffer. Practically, the overflow buffer may also be sorted and compressed in LBA order to facilitate translation. The overflow buffer may have slower translated and update characteristics, but as a low probability event, the slower translated and update characteristics may not impact the overall performance of storage device 104. A small overflow buffer space may thus be preferable when compared with an out of capacity error.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIG. 2 is a block diagram of a logical block address (LBA) space in accordance with some implementations. LBA space 202 may be created to support, for example, a 16 TB storage device 104, wherein the logical capacity may be greater than 16 TB with thin provisioning. To allow thin provisioning on storage device 104 while maintaining a DRAM size that is proportional to the physical capacity (i.e., 16 TB) of storage device 104, LBA space 202 associated with the physical address space on memory device 110 may be divided into equal fixed sized segments (i.e., segments 204A-204N, referred to herein generally as segments 204). In an example, for the 16 TB physical capacity, controller 108 may provide 26.4 TB logical capacity for 13.2 TB physical capacity. Controller 108 may thus divide LBA space 202 into at least 512 segments 204. An LBA in a first segment may be paired with an LBA from each segment in the LBA space to create a LBA set. Each segment 204 may optionally be mapped to or contained within a single namespace that may correspond to a client virtual machine. FIG. 2 is provided as an example. Other examples may differ from what is described in FIG. 2.

FIG. 3 is a block diagram of logical block address (LBA) sets in accordance with some implementation. Each LBA set (shown for example as 302A and 302B and generally referred to herein as LBA set 302) may include an LBA from each segment 204 within LBA space 202. Although FIG. 3 shows only two LBA sets 302, it should be noted that the other LBA sets are not shown for simplicity. Creating LBA sets 302 may create a link between the LBAs in each LBA set 302 to enable the LBAs in the LBA set 302 to share a mapping space in DRAM 106. FIG. 3 is provided as an example. Other examples may differ from what is described in FIG. 3.

FIG. 4 is a block diagram of a logical-to-physical table in a dynamic random-access memory in accordance with some embodiments. L2P table 402 in DRAM 106 may include an LBA set entry 404 (i.e., 404A-404L) per LBA set 302. Information associated with LBAs (for example, the physical location) may be stored within sub-entries 406a-406M of an LBA set entry 404. The number of LBA set entries 404 in DRAM 106 may be equivalent to the logical capacity of storage device 104 (i.e., the total number of LBAs) divided by the number of segments. To find an LBA within an LBA set entry 404 in DRAM 106 without affecting the performance of storage device 104, a bit map may be used to indicate if an LBA from a segment 204 is represented within the LBA set entry 404 in DRAM 106.

Each LBA set entry 404 may further include sub-entries 406a-406M, each sub-entry having size $S^E$ bytes (B), where usually $S^E$ may be equal to 4 and $S^E$ is a space to store the physical address of an LBA. The physical location associated with an LBA may be stored within sub-entry 406 in LBA set entry 404 to which a LBA belongs. Each LBA set entry 404 may also include a segment ID bitmap which may be equal to the number of segments divided by eight bytes. To identify which sub-entry 406 corresponds to a given LBA, LBAs may be assigned segment IDs to be represented in the bitmap. Sub-entries 406 may be sorted by the segment IDs using, for example, a hardware bitmap counter to count occupied segment IDs in the bitmap to find a sub-entry offset. Sub-entry 406 insertions and/or deletions may be carried out by shifting sub-entries 406 to maintain strict order.

The size of a LBA set entry 404 may be equal to the number of segments ($N^S$) divided by eight added to $S^E$ times the physical capacity ($C^E$) of the entry, i.e., $N^S/8+S^E\ C^E$ B (where $S^E=4$ typically). For the 512 segments of FIG. 2, each LBA set entry 404 may have capacity for the physical addresses of 325 LBAs. FIG. 4 is provided as an example. Other examples may differ from what is described in FIG. 4.

With the thin provisioning approach used in some implementations, no additional DRAM space may be required to support an LBA capacity that is greater than the physical capacity of storage device 104. Hardware bit counters for bitmap may be used to understand the position in a sub-entry array for any requested segment ID, for both translation and update. Hardware may be used for insertions and deletions during a write process, wherein left/right-shift of sections of the sub-entry array may be implemented to maintain segment ID order within the array. The hardware bit counter may improve the translation speed. This thin provisioning approach may be used for both random and sequential workloads. Storage device 104 may be capable of holding more data than the nominal physical capacity without becoming full though over-provisioning of the drive.

Figure 5:
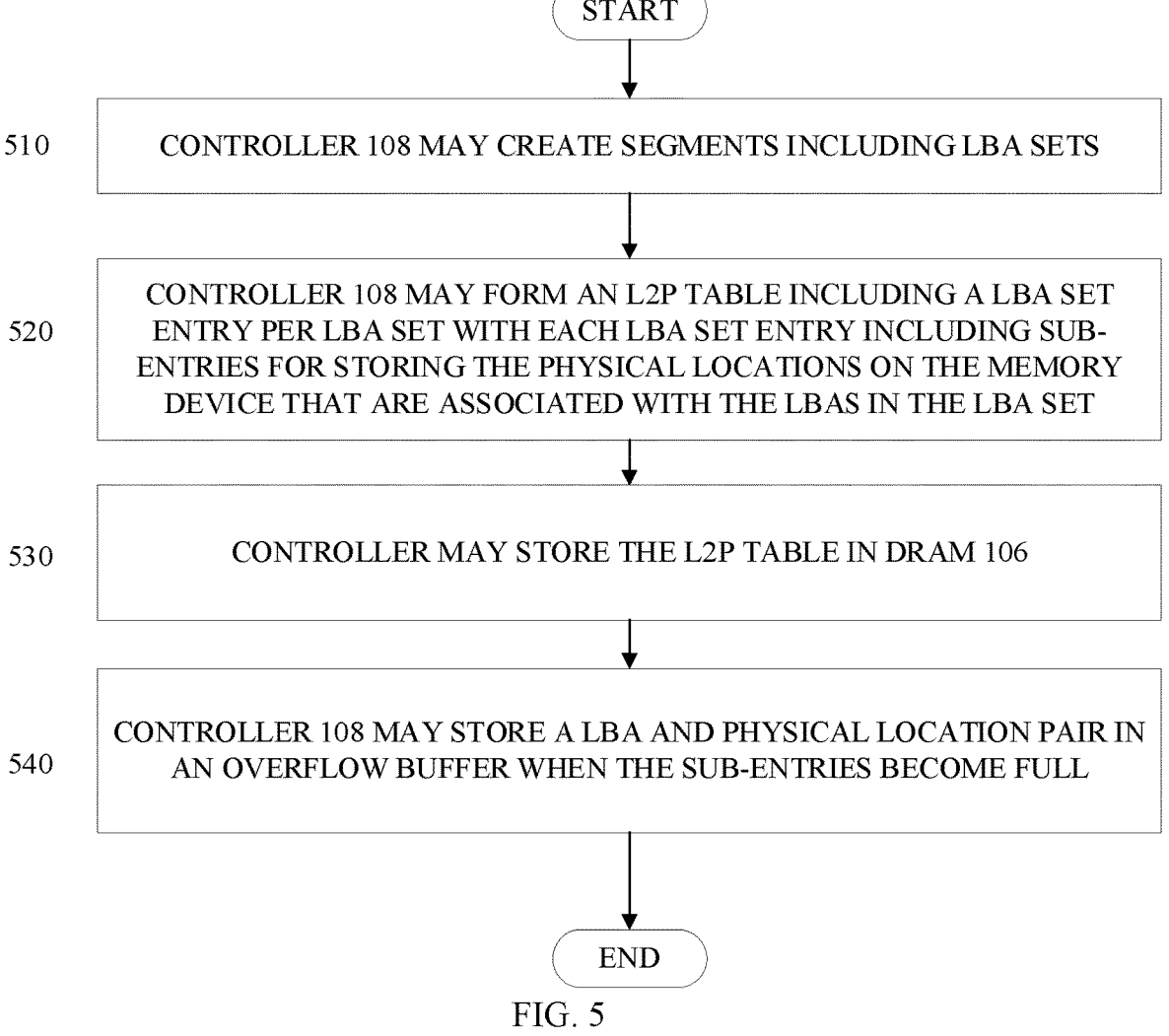
FIG. 5 is an example flow diagram for executing thin provisioning in accordance with some implementations.

FIG. 5 is an example flow diagram for executing thin provisioning in accordance with some implementations. At 410, controller 108 may create segments including LBA sets. At 520, controller 108 may form an L2P table including an LBA set entry per LBA set with each LBA set entry including sub-entries for storing the physical locations on the memory device that are associated with the LBAs in the LBA set. At 530, controller may store the L2P table in DRAM 106. At 540, controller 108 may store a LBA and physical location pair in an overflow buffer when the sub-entries become full. FIG. 5 is provided as an example. Other examples may differ from what is described in FIG. 5.

Figure 6:
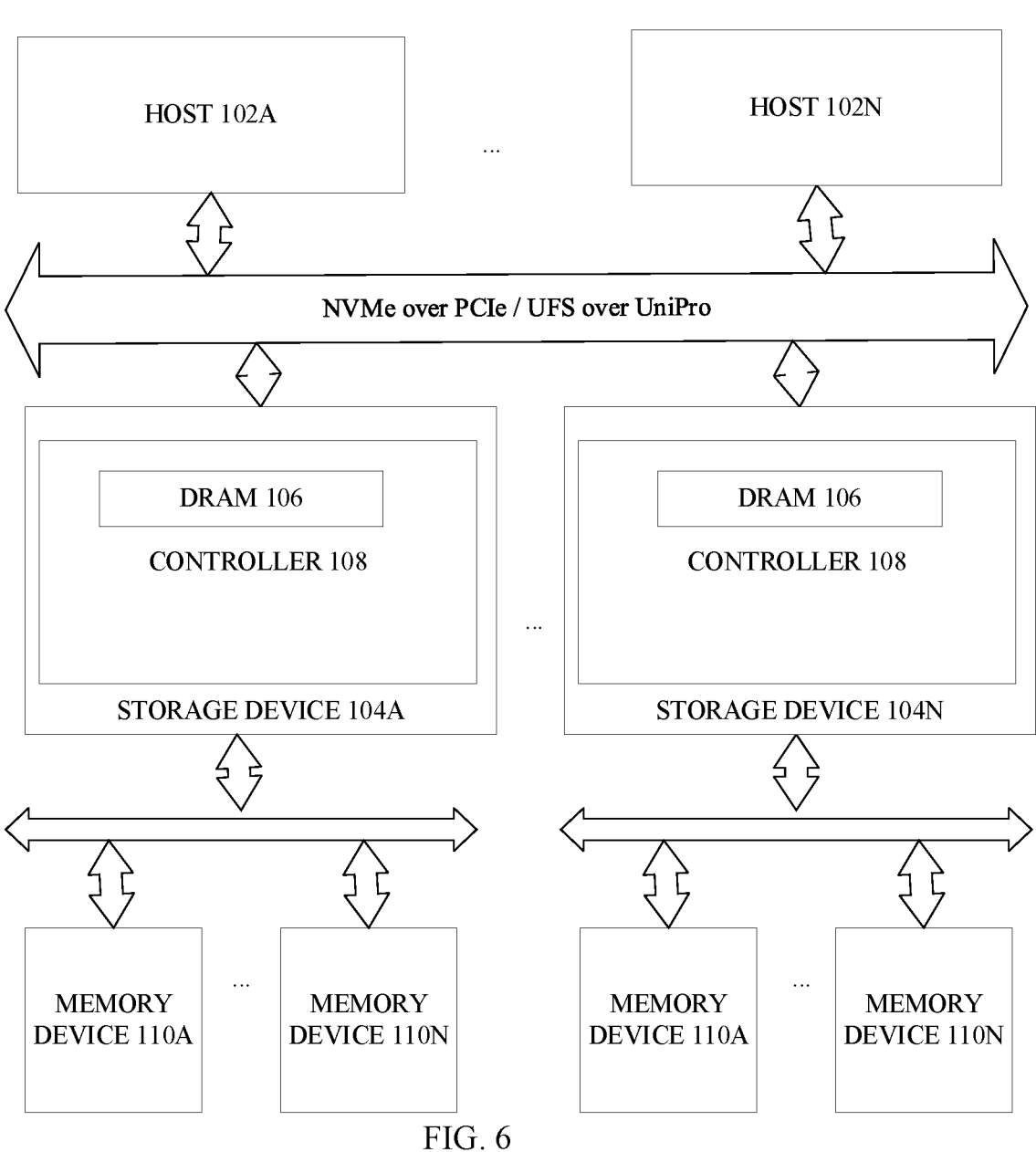
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102n (referred to herein as host(s) 102), and storage devices 104a-104n (referred to herein as storage device(s) 104).

Storage device 104 may include a controller 108 to configure a L2P table for thin provisioning such that the L2P table is stored in a DRAM 106 that has a size that is proportional to the physical capacity of memory device 110. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 600 may interconnect via wired connections, wireless connections, or a combination of wired and wireless connections. For example, the network in FIG. 6 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
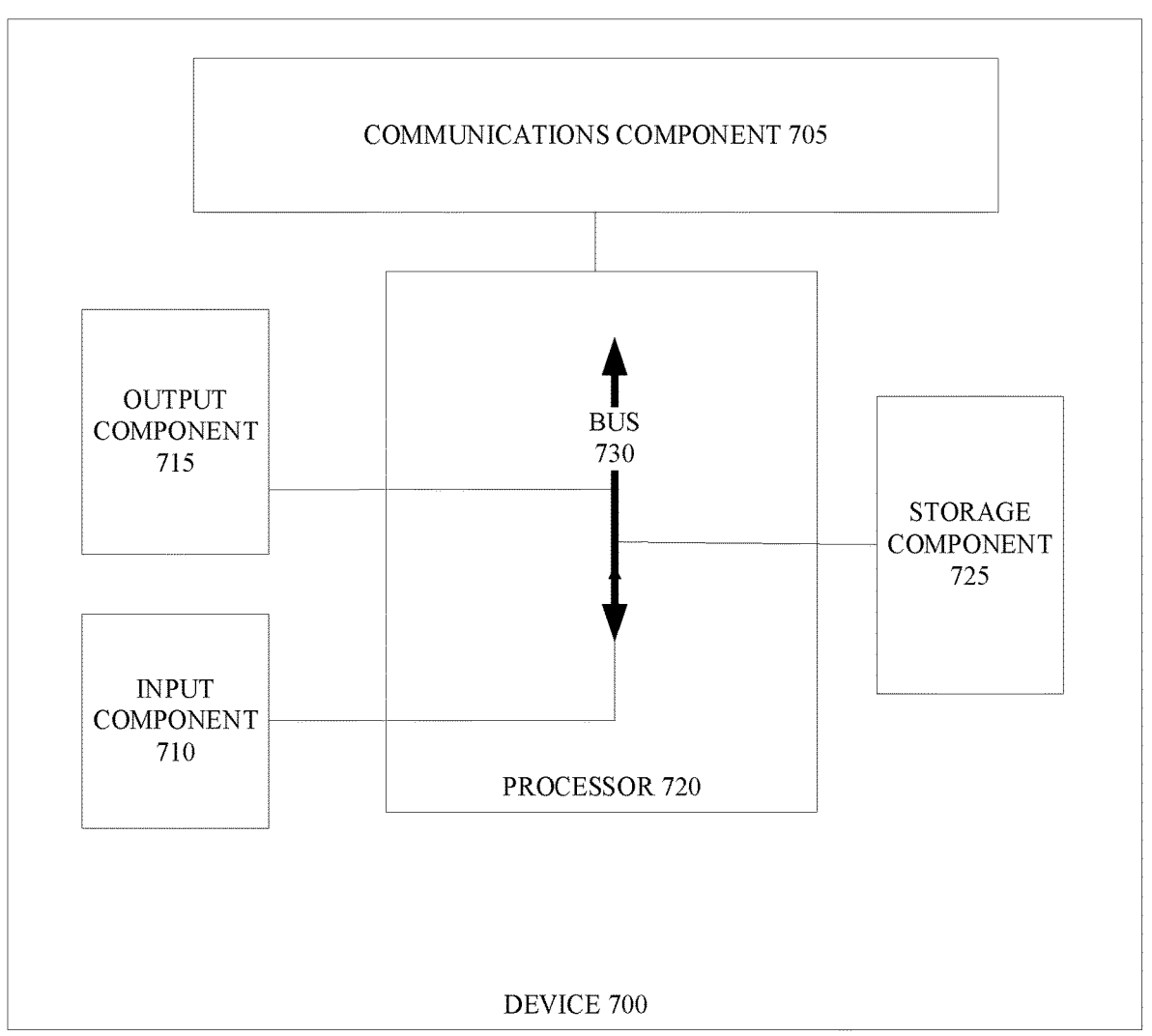
FIG. 7 is a diagram of example components of the host of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device

700 may be coupled to be in communication with other components of device 700 via bus 730.

Input component 710 may include components that permit device 700 to receive information via user input (e.g., keypad, a keyboard, a mouse, a pointing device, a microphone, and/or a display screen), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and/or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range.

Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one of more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to provide thin provisioning by presenting more logical capacity than available physical capacity, the storage device comprises:

a memory device including physical capacity to store data;

a dynamic random-access memory (DRAM) including a size that is proportional to the physical capacity of the memory device; and a controller to create segments including logical block address (LBA) sets in a LBA space, wherein the LBA sets include LBAs from each segment that are linked to enable the LBAs in a LBA set to share a mapping space in the DRAM, to create a logical-to-physical (L2P) table including a LBA set entry per LBA set, with the LBA set entry including sub-entries to store physical locations on the memory device that are associated with the LBAs in the LBA set, and to store the L2P table in the DRAM, wherein the L2P table presents more logical capacity than the physical capacity of the storage device, wherein the sub-entries include insufficient space to concurrently store the physical locations for all LBAs within a LBA set.

2. The storage device of claim 1, wherein the controller divides a LBA space associated with a physical address space on the memory device into equal fixed sized segments.

3. The storage device of claim 2, wherein a segment is mapped to a namespace.

4. The storage device of claim 1, wherein the controller maps a LBA in a first segment with a LBA from other segments in the LBA space to create the LBA set.

5. The storage device of claim 1, wherein the controller maps the LBAs in the LBA set in at least one of an algorithmic manner and a random manner.

6. The storage device of claim 1, wherein a number of LBA set entries in the DRAM is equivalent to a logical capacity of the storage device divided by a number of segments.

7. The storage device of claim 1, wherein a size of a LBA set entry is equal to a number of segments divided by eight added to a space to store a physical address ($S^E$) times the physical capacity ($C^E$) of the entry.

8. The storage device of claim 1, wherein the controller manages the DRAM to speed up acceleration, translation, and update of LBAs contained within sub-entries.

9. The storage device of claim 1, wherein the controller uses a bitmap to find an LBA within the LBA set entry, wherein the LBA set entry includes a segment ID bitmap equal to a number of segments divided by eight bytes.

10. The storage device of claim 1, wherein the controller assigns segment identifiers to the LBAs in the LBA set entry to be represented in a bitmap and sorts the segment identifiers to count occupied segment IDs in the bitmap to find a sub-entry offset.

11. The storage device of claim 1, wherein the controller at least one of adds and deletes a sub-entry by shifting sub-entries to maintain an order.

12. The storage device of claim 1, wherein the controller randomizes storage of the LBAs within segments.

13. The storage device of claim 1, wherein the controller stores a physical location for the LBAs in an overflow buffer when the sub-entries in the LBA set entry are full, wherein an overflow buffer entry format includes a LBA and physical location pair.

14. The storage device of claim 1, wherein the controller stores an overflow buffer for the L2P table in the DRAM.

15. A storage device to provide thin provisioning by presenting more logical capacity than available physical capacity, the storage device comprises:

a memory device including a physical capacity to store data;

a dynamic random-access memory (DRAM) including a size that is proportional to the physical capacity of the memory device;

an overflow buffer; and a controller to create segments including logical block address (LBA) sets, to create a logical-to-physical (L2P) table including a LBA set entry per LBA set with the LBA set entry including sub-entries to store physical locations on the memory device that are associated with the LBAs in the LBA set, to store the L2P table in the DRAM, and to store a LBA and physical location pair in the overflow buffer when the sub-entries become full, wherein the L2P table presents more logical capacity than the physical capacity of the storage device.

16. The storage device of claim 15, wherein on an LBA update when the sub-entries in the LBA set entry are full, if a segment identifier associated with the LBA is less than a segment identifier of a last sub-entry, the controller shifts the last sub-entry to the overflow buffer, wherein the LBA is reconstructed from the segment identifier and a LBA set entry identifier.

17. The storage device of claim 15, wherein on an LBA update when the sub-entries in the LBA set entry are full, if a segment identifier associated with the LBA is greater than a segment identifier of a last sub-entry, the controller adds a new LBA to the overflow buffer.

18. A method for providing thin provisioning on a storage device including a memory device including a physical capacity to store data and a dynamic random-access memory (DRAM) having a size that is proportional to the physical capacity of the memory device, the storage device includes a controller to execute the method comprising:

creating segments including logical block address (LBA) sets;

forming a logical-to-physical (L2P) table including a LBA set entry per LBA set, with the LBA set entry including sub-entries for storing physical locations on the memory device that are associated with the LBAs in the LBA set; and storing the L2P table in the DRAM, wherein the L2P table presents more logical capacity than the physical capacity of the storage device.

19. The method of claim 18, further comprising storing a LBA and physical location pair in an overflow buffer when the sub-entries become full.

* * * * *